3,264,136
POLYETHYLENE TEREPHTHALATE FILM WITH FINELY DIVIDED POLYMETHYL METHACRYLATE COATING
Derek Gordon Hedge, Welwyn Garden City, England, assignor to Imperial Chemical Industries, Limited, London, England, a corporation of Great Britain
No Drawing. Filed Nov. 5, 1962, Ser. No. 239,392
Claims priority, application Great Britain, Nov. 8, 1961, 40,030/61
3 Claims. (Cl. 117—138.8)

This invention relates to improved plastic films wherein the improvement resides in the provision in or on the surface of the film of a finely dispersed polymeric material and also to methods of making them.

For ease of handling film products, particularly if they are very thin, it is essential that the coefficient of friction between two layers of film should be low; a film with this property is said to have good "slip." British specification 707,549 provides a process of treating a surface of a sheet film or coating comprising an organic thermoplastic material to improve the slip thereof, which includes a step of contacting said surface with a composition comprising a solution of a surface active agent which will wet but not dissolve said surface having dispersed therein a finely divided synthetic organic polymerisation product that is not harder than the said surface and drying the surface under conditions such that the synthetic organic polymerisation product remains on the surface in the form of discrete particles. Particular polymeric materials suggested in this specification for use as finely divided particles include polythene, polytetrafluoroethylene, polytrifluoro-monochloroethylene, inter polymers of ethylene with other polymerisable materials, vinyl polymers such as polyvinyl chloride and polyvinyl acetate, and superpolyamides. The use of such materials however tends to impair the optical qualities of the finished film. The light transmission through the film is reduced and the film surface is less glossy. These optical defects are thought to be caused by scattering of the light by the particles on the surface and film having the defects is said to be hazy.

I have now found that for similar particle sizes, if polymethyl methacrylate dispersions are used, slip properties are imparted to the film and the optical properties of the slip coated film are improved compared with slip coated films using any of the finely divided polymers of specification No. 707,549; and that by employing polymethyl methacrylate particles which are sufficiently large to confer slip properties, the high transparency and surface gloss of the film may not be seriously affected, that is to say it will remain substantially haze-free. This is surprising and the reason for the difference in optical properties between coatings of polymethyl methacrylate and those described in specification No. 707,549 is not yet understood.

The invention provides therefore an organic thermoplastic film having coated upon its surface, finely divided particles of polymethyl methacrylate, said film being substantially haze-free. The particles may remain wholly on the surface of the film or they may be partially embedded.

In general the bulk of the finely divided polymethyl methacrylate particles should have a size in the range of 0.1 to 2 microns, since with a particle size below 0.1 micron adequate slip properties tend not to be obtained and above 2 microns the film becomes hazy—i.e. it has a haze value measured according to A.S.T.M. Test D1003-52 which is above about 2%. As the particle size is increased, slip is improved but haze is increased and a compromise is sought for a particle size giving the best combination of these properties for the purpose envisaged for the film. For most purposes, to get the best combination of properties, the particle size is preferably in the range of 0.1 to 0.7 micron.

The preferred films coated with polymethyl methacrylate particles according to the present invention are coated polyethylene terephthalate films having a static coefficient of friction of film sliding on film of no greater than 0.6 preferably less than 0.4, in combination with a haze value measured according to A.S.T.M. Test D1003-52 of less than 2%.

The finely divided polymethyl methacrylate may, according to the invention, be applied to the film as for instance an aqueous dispersion in the presence of a suitable emulsifying agent, and the water is then dried off. Polymethyl methacrylate particles are then left on or partially embedded in the film and act as a slip agent.

The emulsifying agent may conveniently comprise a non-ionic surface active agent. Any of the known non-ionic surface active agents may be used, such as polyoxyethylene ethers of one or more alkyl phenols or fatty alcohols, that is alcohols corresponding to fatty acids of animal and vegetable fats and oils. Alternatively, if film having good antistatic properties is required the emulsifying agent preferably comprises a cationic surface active agent, and more preferably it consists wholly of a cationic surface active agent. Surprisingly, I have found that in this latter case a further improvement in slip properties is obtained. The preferred cationic surface active agent has the formula R'—N+R₃"X⁻;

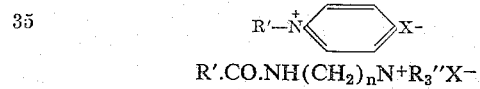

R'.CO.NH(CH₂)ₙN+R₃"X⁻ or R'.CO.O(CH₂)ₙ—N+R₃"X⁻; where R' is a "long chain of carbon atoms" as hereinafter defined R" is an alkyl or alkenyl residue which may be substituted with hydroxyl or aryl groups, n=1 to 10 and X⁻ is an anion. More preferably it has the formula

R'.CO.NH(CH₂)ₙN+R₃"X⁻ or R'.CO.O(CH₂)ₙN+R₃"X⁻, and n=3.

A "long chain of carbon atoms" as herein defined is a chain of atoms, principally of carbon, which may be unsaturated and may have atoms other than carbon in the chain or substituted on to it, e.g., oxygen or nitrogen atoms. Such a chain normally contains at least 8 carbon atoms and if an alkyl chain, for convenience the alkyl group is derived from a fatty acid or fatty alcohol. The chain may be a condensate of formaldehyde or of an alkylene oxide or glycol, e.g., ethylene oxide or propylene oxide.

Alternatively, according to the invention, the polymethyl methacrylate may be applied in conjunction with a coating intended to give the film heat sealing properties, for example an aqueous dispersion of polymethyl methacrylate particles may be mixed before application to the film surface with an aqueous dispersion of another heat-sealable polymer. The mixed dispersions may then be coated onto the film surface and the water dried off. The polymethyl methacrylate particles which then protrude from the homogeneous heat seal coating again provide good slip properties without undue haze. Yet again the polymethyl methacrylate particles may be incorporated into a solution (lacquer) of another heat-sealable polymer in an organic solvent which is not a solvent for polymethyl methacrylate or for the thermoplastic material of the base film, the lacquer applied to the surface of the film and the solvent subsequently removed. Again the polymethyl methacrylate particles which protrude through the homogeneous heat seal coating provide good slip without undue haze. The heat-sealable polymer used with the polymethyl methacrylate in accordance with this aspect of my invention may be any polymer or copolymer which, when applied as a coating to the film, enables the latter to be heat sealed by standard heat sealing equipment. Because they give hard coatings and high heat seal strengths and because of their resistance to moisture and their low gas permeability, the heat sealable polymers which are particularly preferred are the copolymers of vinylidene chloride and acrylonitrile (e.g. 80–95%/20–5% copolymers). Other heat-sealable polymers which may be used include polyvinyl acetate, partially hydrolysed polyvinyl acetate, butadiene/acrylonitrile copolymers, butadiene/styrene copolymers of vinylidene chloride with vinyl chloride or alkyl acrylates, copolymers of vinyl acetate with vinyl chloride or ethylene and copolymers of vinyl chloride with ethylene.

The films of this invention may also have on their surfaces, in addition to the finely divided polymethyl methacrylate particles of this invention, a wax which is preferably emulsified which helps to ensure permanence of the improved surface characteristics imparted by the finely divided polymethyl methacrylate. Suitable waxes include amide waxes, ether waxes, ester waxes, microcrystalline petroleum wax, bees wax, paraffin wax, and polyethylene and polyisobutylene waxes. Usually, however, the polymethyl methacrylate particles are sufficiently adherent to the surface without the use of wax.

The thermoplastic film to which the finely divided polymethyl methacrylate is applied may be a linear polyester film, e.g., a film of a linear high molecular weight terephthalate polyester for instance polyethylene terephthalate (which is preferably biaxially oriented and heat set); or a poly-α-olefin film such as polythene or polypropylene film which is not oriented or oriented as desired, e.g., a polypropylene film which is biaxially oriented, or biaxially oriented and heat set, or a similar film of poly-4-methyl-pentene-1 or polybutene-1.

When polyethylene terephthalate biaxially oriented film is coated on the surface with finely divided polymethyl methacrylate it is preferred to apply the polymethyl methacrylate as an aqueous dispersion after the film has been drawn in one direction, the water dried off, and the coated film is then drawn in a direction at rights to the first direction. If desired, the resulting biaxially drawn film may be subsequently heat set. For instance, the film may first be drawn in the machine direction, the coating applied and the coated film thereafter drawn in the direction transverse to that of the first drawing, the second drawing being conveniently carried out in a stenter. The following examples illustrate a polyethylene terephthalate film coated on its surface with finely divided polymethyl methacrylate according to this invention and a process according to the invention for obtaining it.

*Example 1*

A polyethylene terephthalate film was melt extruded and cast on to a rotating drum maintained at about 80° C. and then drawn in the machine direction with a draw ratio of about 3.5:1 and was then coated on both sides using gravure rolls with an aqueous dispersion of finely divided polymethyl methacrylate, the bulk of which had a particle size of 0.3 micron. The dispersion was emulsified by the presence of 5% (on dry weight of the coating) of cetyl pyridinium bromide and also contained a para-alkyl phenol ethylene oxide condensation product, a non-ionic surface active agent which behaved as an extra wetting agent (0.4% by volume of coating dispersion). The dispersion contained 0.4% by weight of polymethyl methacrylate.

After coating the film was passed into a stenter where the coating was first dried and the film then drawn sideways with a draw ratio of about 3.5:1 and then heat set. The weight of the coating on the finished film was 5 milligrams per square metre on each side of it.

The haze value of the film measured using a Baldwin pivotable haze meter according to A.S.T.M Test D1003–52 was 0.2% compared with a haze value of 2% when similar film was coated similarly with finely divided polyvinyl chloride of which the bulk had a particle size of 0.4 micron.

The slip characteristics of the film were determined using an automatic friction measuring apparatus, which makes ten determinations of static coefficient of friction for each sample using a fresh area of film for each determination. A sled wrapped in the film under test is held stationary against a moving piece of film and the force on the sled is measured by a load measuring device.

The coefficient of friction of the film made according to this example was 0.6.

*Example 2*

Biaxially oriented and heat set polyethylene terephthalate film was coated on both sides using gravure rolls with an aqueous dispersion of finely divided polymethyl methacrylate, the bulk of which had a particle size of 0.3 micron. The dispersion was emulsified by the presence of 5% (on dry weight) of cetyl pyridinium bromide and also contained a para-alkyl phenol ethylene oxide condensation product, a non-ionic surface active agent which behaved as an extra wetting agent (0.4% by volume of coating dispersion). The dispersion contained 0.14% by weight of polymethyl methacrylate.

After coating, the film was passed into an oven maintained at 160° C. where the coating was dried. The weight of the coating when dried was 5 milligrams per square metre on each side of it.

The coefficient of friction of the film was 0.6.

*Example 3*

Biaxially oriented and heat set polyethylene terphthalate film was coated on both sides using gravure rolls with an aqueous dispersion of finely divided polymethyl methacrylate, the bulk of which had a particle size of 0.3 micron. The coating dispersion contained 0.14% by weight of polymethyl methacrylate and 1.75% (on dry weight of the coating) of cetyl pyridinium bromide, and also contained 0.2% by volume of stearamido-propyl dimethyl β-hydroxyethyl ammonium nitrate, a cationic surface active agent which behaved as an extra wetting agent and antistatic agent.

After coating, the film was passed through an oven at 160° C. where the coating was dried. The weight of the coating when dried was 5 milligrams per square metre on each side of it.

The coefficient of friction of the film was 0.25.

I claim:

1. Polyethylene terephthalate film having coated upon its surface finely divided particles of polymethyl methacrylate in which the bulk of said particles have a size in the range of 0.1 to 2 microns, said coated film having a static coefficient of friction of film sliding on film of no greater than 0.6 and a haze value measured according to A.S.T.M. Tests D1003–52 of less than 2%.

2. Coated polyethylene terephthalate film according to claim 1 having a static coefficient of friction of less than 0.4.

3. Polyethylene terephthalate film according to claim 1 in which the bulk of said particles have a size in the range of 0.1 to 0.7 micron.

(References on following page)

References Cited by the Examiner

UNITED STATES PATENTS

| | | |
|---|---|---|
| 2,125,527 | 8/1938 | Tyce et al. |
| 2,678,285 | 5/1954 | Browning. |
| 2,805,963 | 9/1957 | Gaylord. |
| 2,910,385 | 10/1959 | Berry et al. _____ 117—145 XR |
| 3,014,004 | 12/1961 | Meier. |
| 3,045,285 | 7/1962 | Baird et al. |
| 3,100,721 | 8/1963 | Holden. |

FOREIGN PATENTS 707,549   4/1954   Great Britain.

WILLIAM D. MARTIN, *Primary Examiner.*

RICHARD D. NEVIUS, *Examiner.*

D. TOWNSEND, H. E. COLE, W. D. HERRICK,
*Assistant Examiners.*